(12) United States Patent
Blaszczyk et al.

(10) Patent No.: US 8,092,943 B2
(45) Date of Patent: Jan. 10, 2012

(54) FUEL CELL SYSTEM WITH IMPROVED FUEL RECIRCULATION

(75) Inventors: Janusz Blaszczyk, Richmond (CA); Richard G. Fellows, Vancouver (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 1376 days.

(21) Appl. No.: 11/406,830

(22) Filed: Apr. 19, 2006

(65) Prior Publication Data
US 2007/0248858 A1    Oct. 25, 2007

(51) Int. Cl.
*H01M 8/00* (2006.01)
*H01M 8/04* (2006.01)

(52) U.S. Cl. ......................................... 429/400; 429/446

(58) Field of Classification Search .................... 429/13, 429/25, 400, 446
See application file for complete search history.

(56) References Cited

U.S. PATENT DOCUMENTS

| | | | |
|---|---|---|---|
| 5,441,821 A | 8/1995 | Merritt et al. | 429/17 |
| 6,699,610 B2 | 3/2004 | Yang | 429/22 |
| 6,800,390 B2 | 10/2004 | Kashiwagi | 429/34 |
| 2003/0148167 A1 | 8/2003 | Sugawara et al. | 429/34 |
| 2003/0180599 A1 | 9/2003 | Kamihara | 429/34 |
| 2005/0064255 A1* | 3/2005 | Blaszczyk et al. | 429/19 |
| 2005/0100777 A1 | 5/2005 | Gurin et al. | |
| 2005/0238934 A1 | 10/2005 | Takahashi | |
| 2005/0260463 A1* | 11/2005 | Chapman et al. | 429/13 |

FOREIGN PATENT DOCUMENTS

| | | |
|---|---|---|
| FR | 2712099 A1 | 5/1995 |
| JP | 2001266922 A1 | 9/2001 |
| JP | 2004-362825 | 12/2004 |

OTHER PUBLICATIONS

Abstract of Japanese Patent Publication No. JP2001266922, published Sep. 28, 2001, to Sugawara et al.
International Preliminary Report on Patentability and Written Opinion in PCT/US2007/009586 dated Oct. 22, 2008.
Office Action in European Patent Application No. 07 775 785.4-1227 dated Feb. 23, 2010.

* cited by examiner

*Primary Examiner* — Patrick Ryan
*Assistant Examiner* — Muhammad Siddiquee
(74) *Attorney, Agent, or Firm* — Patent Central LLC; Stephan A. Pendorf

(57) ABSTRACT

A fuel cell system comprising a fuel cell stack, a fuel recirculation line provided with a jet pump and a valve controlled by a control unit based on the anode-cathode pressure differential such that the valve is closed to reduce or stop fuel supply when the anode-cathode pressure differential reaches a predetermined value, and opened again to circulate more fuel through the jet pump when the pressure differential is below a predetermined value, to create a pulsed fuel supply that improves the fuel recirculation at low loads and ensures adequate water removal from the anode flow field channels.

3 Claims, 3 Drawing Sheets

FUEL CELL SYSTEM WITH IMPROVED FUEL RECIRCULATION

BACKGROUND OF THE INVENTION

1. Field of the Invention

The present invention generally relates to fuel cell systems and, in particular, to fuel cell systems employing improved fuel recirculation at low loads.

2. Description of the Related Art

Electrochemical fuel cells are used to produce energy by converting reactants, namely fuel and oxidant, through the electrochemical reactions that take place within the fuel cell. They do not generate any pollutants and therefore have gained popularity as an attractive alternative to the internal combustion engine. One type of fuel cell that has been used for automotive and other industrial applications because of its low operating temperature is the solid polymer fuel cell. Solid polymer fuel cells employ a membrane electrode assembly ("MEA") that includes an ion exchange membrane disposed between two electrodes that carry a certain amount of catalyst at their interface with the membrane.

The catalyst is typically a precious metal composition (e.g., platinum metal black or an alloy thereof) and may be provided on a suitable support (e.g., fine platinum particles supported on a carbon black support). A catalyst is needed to induce the electrochemical reactions within the fuel cell. The electrodes may also comprise a porous, electrically conductive substrate that supports the catalyst layer and that is also employed for purposes of electrical conduction, and/or reactant distribution, thus serving as a fluid diffusion layer.

During normal operation of a solid polymer fuel cell, fuel is electrochemically oxidized at the anode catalyst, typically resulting in the generation of protons, electrons, and possibly other species depending on the fuel employed. The protons are conducted from the reaction sites at which they are generated, through the ion-exchange membrane, to electrochemically react with the oxidant on the cathode side. The electrons travel through an external circuit providing useable power and then react with the protons and oxidant at the cathode catalyst to generate water as a reaction product.

During normal fuel cell operation water is created on the cathode as a result of fuel oxidation. Some of the water produced at the cathode may pass to the anode side where it can condense, creating water droplets that may block the fuel flow field channels. This may result in insufficient fuel being provided to the active area of the fuel cell. In some fuel cell systems excess fuel is passed through the channels to expel the water droplets. However, venting excess fuel into the atmosphere is undesirable in many instances.

As a result, and in order to minimize the waste that would result from venting the unconsumed reactants, the reactants may be recirculated via a recirculation loop. For example, the recirculated reactant may be merged directly with the incoming fresh reactant stream, thereby humidifying the incoming fresh reactant stream with the accumulated product water and avoiding the need of a separate humidifier.

A pump or a blower is typically used to move the reactant through the recirculation loop. However, these devices increase the parasitic load on the fuel cell and present other disadvantages in weight, cost, and reliability. Vacuum ejectors (jet pumps) have also been employed to effect recirculation. However, an ejector sized to supply the needed inlet flow rate to the fuel cell stack during periods of maximum-load typically employs a nozzle that is too large to recirculate the fuel during periods of low-load (e.g., idle periods). Thus, at low loads the fuel feed pressure is too low to ensure satisfactory recirculation.

This problem has been addressed by modifying the construction of the jet pump, or through control strategies to ensure satisfactory fuel recirculation. For example, a multiple jet ejector assembly is described in U.S. Application Publication No. 2005/0064255 that includes a common suction chamber, a low-flow nozzle and a low-flow diffuser, and a high-flow nozzle and a high-flow diffuser. The low-flow nozzle and diffuser are configured to entrain the recirculated flow at low loads, while the high-flow nozzle and diffuser are configured for high-load conditions. A separate nozzle and diffuser may be provided for ultra-low flows, as needed during idle conditions.

Alternatively, U.S. Pat. No. 5,441,821 describes a control strategy involving a regulated pressure control valve capable of maintaining a relatively uniform inlet fuel stream pressure over a range of operating conditions under different loads, and consequently maintaining a relatively uniform outlet fuel stream recirculation ratio. The pressure control valve is also regulated to maintain a balance between the pressure of the inlet fuel stream and the pressure of the inlet oxidant stream.

While various advances have been made in this field, there remains a need for a less costly, less complex and/or more efficient approach to operating a fuel cell system with improved fuel recirculation at idle conditions, while allowing the removal of water droplets from the anode side. The present invention addresses this issue and provides further related advantages.

BRIEF SUMMARY OF THE INVENTION

A fuel cell system is disclosed comprising a fuel cell stack having a fuel inlet and fuel outlet and an oxidant inlet and oxidant outlet and at least one fuel cell having a membrane, an anode and a cathode, the anode fluidly connected to the fuel inlet and fuel outlet and the cathode fluidly connected to the oxidant inlet and oxidant outlet. The system further comprises a fuel supply line for supplying fuel to the fuel inlet, a jet pump connected to the fuel supply line, a recirculation line connecting the fuel outlet with the jet pump, a valve upstream of the jet pump for opening and closing the fuel supply to the stack, and a control unit for operating the valve in response to an operational parameter indicative of the anode-cathode pressure differential. The control unit controls the valve to produce a pulsed fuel supply to the stack when the load applied to the fuel cell system is below a value L. The value L is the load that satisfies a minimum anode pressure differential between the anode inlet and anode outlet that ensures adequate removal of water droplets accumulated in the anode flow field channels.

In one embodiment, the control unit closes the valve to reduce or, alternatively, stop the fuel supply to the stack when the operational parameter indicative of the anode-cathode pressure differential reaches a first predetermined threshold value A, and opens the valve to restart the fuel supply to the stack when the anode-cathode pressure differential reaches a second predetermined threshold value B, the first predetermined threshold value B being lower than the second predetermined threshold value A. This produces a pulsed fuel supply to the jet pump. The pulsed fuel supply improves fuel recirculation at low loads and ensures water removal from the anode side.

In another embodiment, the jet pump comprises a main pump and a pulsing jet pump such that, when the load applied to the fuel cell system is below value L, fuel passes through the valve and the pulsing jet pump. When the load is above value L, fuel bypasses the valve and passes through the pressure regulator, an additional valve and the main pump. This embodiment is effective for fuel cell systems that can tolerate smaller anode-cathode pressure differentials.

A method for recirculating a fuel reactant stream in the fuel cell system described above is also disclosed. This method comprises the step of controlling the valve to produce a pulsed fuel supply to the stack when a load applied to the fuel cell system is below value L. The control unit closes the valve to reduce or, alternatively, stop the fuel supply to the stack when the operational parameter indicative of the anode-cathode pressure differential is above a first predetermined threshold value A, and opens the valve to restart the fuel supply to the stack when the operational parameter indicative of the anode-cathode pressure differential drops below a second predetermined threshold value B, the second predetermined threshold value B being lower than the first predetermined threshold value A.

These and other aspects of this invention will be evident upon reference to the attached drawings and following detailed description.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with fuel cells, fuel cell stacks, and fuel cell systems have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to". Further, reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Such particular features, structures, or characteristics may be combined in any suitable manner in one or more embodiments.

Figure 1:
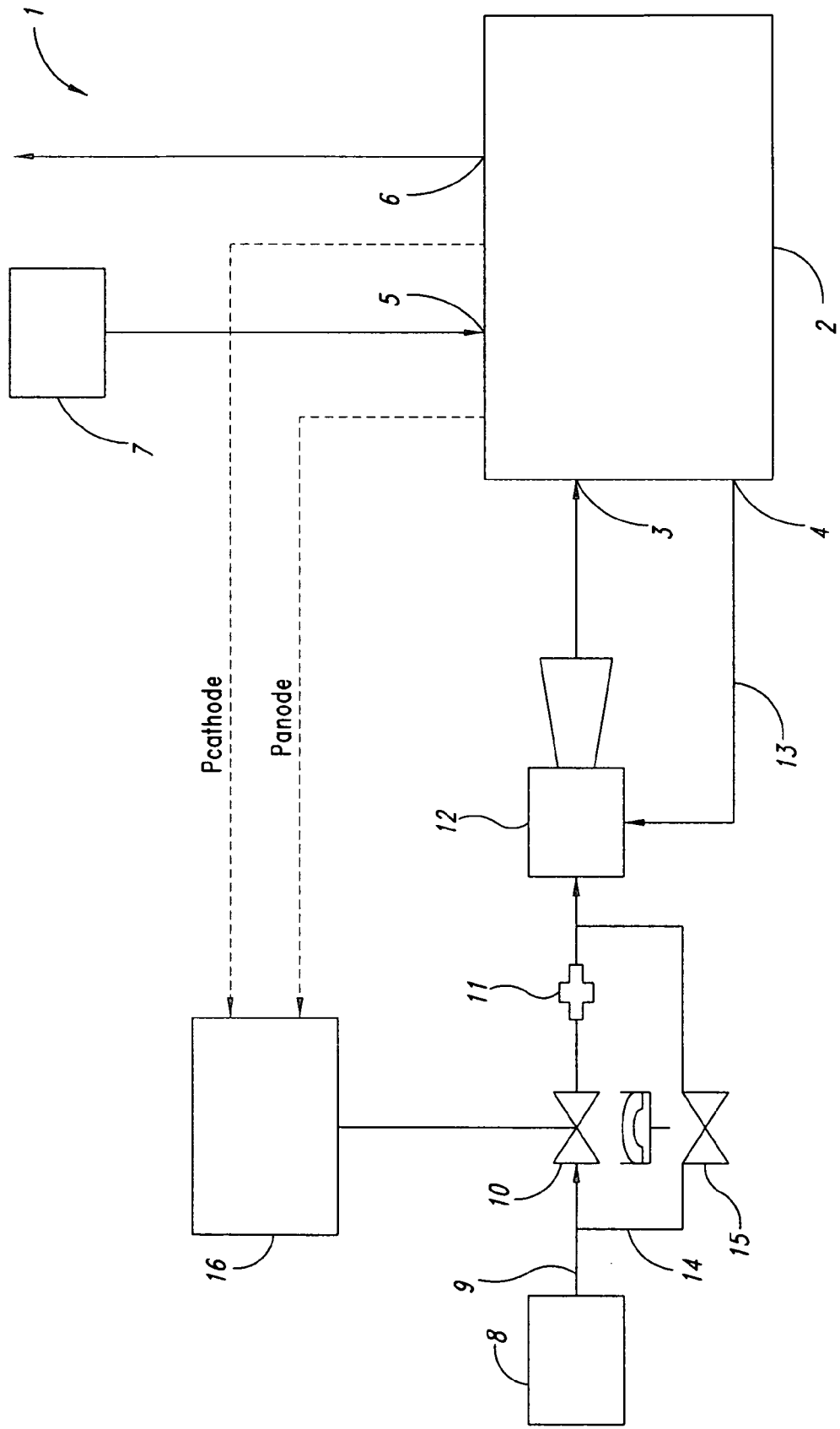
FIG. 1 is a schematic diagram of an embodiment of a fuel cell system including a single jet pump for recirculating the fuel stream and the solenoid valve used for creating the pulsed fuel supply to the stack.

A fuel cell system 1, according to one embodiment shown in FIG. 1, includes fuel cell stack 2 comprising a plurality of fuel cells (not shown), each comprising a membrane electrode assembly (MEA). Each MEA comprises an anode, a cathode and an electrolyte, such as a solid polymer ion exchange membrane (not shown). Each MEA is positioned between the active surfaces of two separator plates, each describing flow fields on the active surface thereof, which contacts the MEA, for distributing fuel or oxidant fluid streams to the active area of the contacted electrode of the MEA (not shown). The anode flow fields are fluidly connected to stack fuel inlet 3 and fuel outlet 4, while the cathode flow fields are fluidly connected to stack oxidant inlet 5 and oxidant outlet 6.

Oxidant is supplied from oxidant supply 7 to fuel cell stack 2 through oxidant inlet 5, and is exhausted from the fuel cell stack through oxidant outlet 6. The oxidant supplied to the fuel cell stack creates a pressure on the cathode side in each fuel cell of the fuel cell stack. Air supply 7 may supply oxidant to the fuel cell stack at ambient or higher pressure, as desired. Fuel supply 8 supplies fuel to the fuel cell stack via fuel inlet 3. Suitable fuel supplies include, for example, a pressurized hydrogen tank, a hydrogen adsorption device (e.g., metal hydride, carbon nanotube) and/or a hydrocarbon fuel processing system. The supplied fuel creates a pressure on the anode side in each fuel cell of the fuel cell stack.

A broad range of reactants can be used in solid polymer fuel cells and may be supplied in either gaseous or liquid form. For example, the oxidant stream may be substantially pure oxygen gas or a dilute oxygen stream such as air. The fuel may be, for example, substantially pure hydrogen gas or a gaseous hydrogen containing reformate stream.

Fuel supply 8 supplies fuel through pressurized fuel supply line 9 to the fuel cell stack fuel via fuel inlet 3 through valve 10, restriction orifice 11 and jet pump 12. Fuel exhausted from the fuel cell stack via fuel outlet 4 is recirculated through fuel recirculation line 13. Bypass line 14 provided with pressure regulator 15 is arranged in parallel to fuel supply line 9.

Valve 10 may be, for example, a solenoid valve that serves to close or open the fuel circulation through fuel supply line 9 at a rate that corresponds to the desired fuel pressure during idle conditions.

Jet pump 12 is employed to entrain the recirculated fuel from fuel outlet 4 and merge it with the fresh pressurized fuel stream from fuel supply 8. In general terms, a jet pump transports a fluid from one pressure to a relatively higher pressure, thereby entraining a relatively low-pressure fluid introduced at the suction inlet of the jet pump. The two streams mix when they pass into the mixer portion of the jet pump. Then the fluids pass into the diffuser portion of the jet pump, where the relatively high velocity of the mixed fluids is converted into static pressure. When the jet pump is effecting fuel recirculation, this static pressure creates a pressure differential between the anode inlet and outlet (i.e., fuel inlet 3 and fuel outlet 4). The anode pressure differential is therefore a measure of the jet pump effectiveness. The anode pressure differential also indicates the amount of fuel moved through the anode flow field channels, and therefore it is related to the effectiveness of removing water droplets from these channels. Jet pump 12 is controlled by varying the feed pressure of the motive fluid.

The system is further provided with a control unit 16 which receives inputs indicative of the anode and cathode pressures within the stack, calculates the anode-cathode pressure differential and controls the operation of valve 10 to maintain this parameter below a predetermined allowed value.

Figure 2:
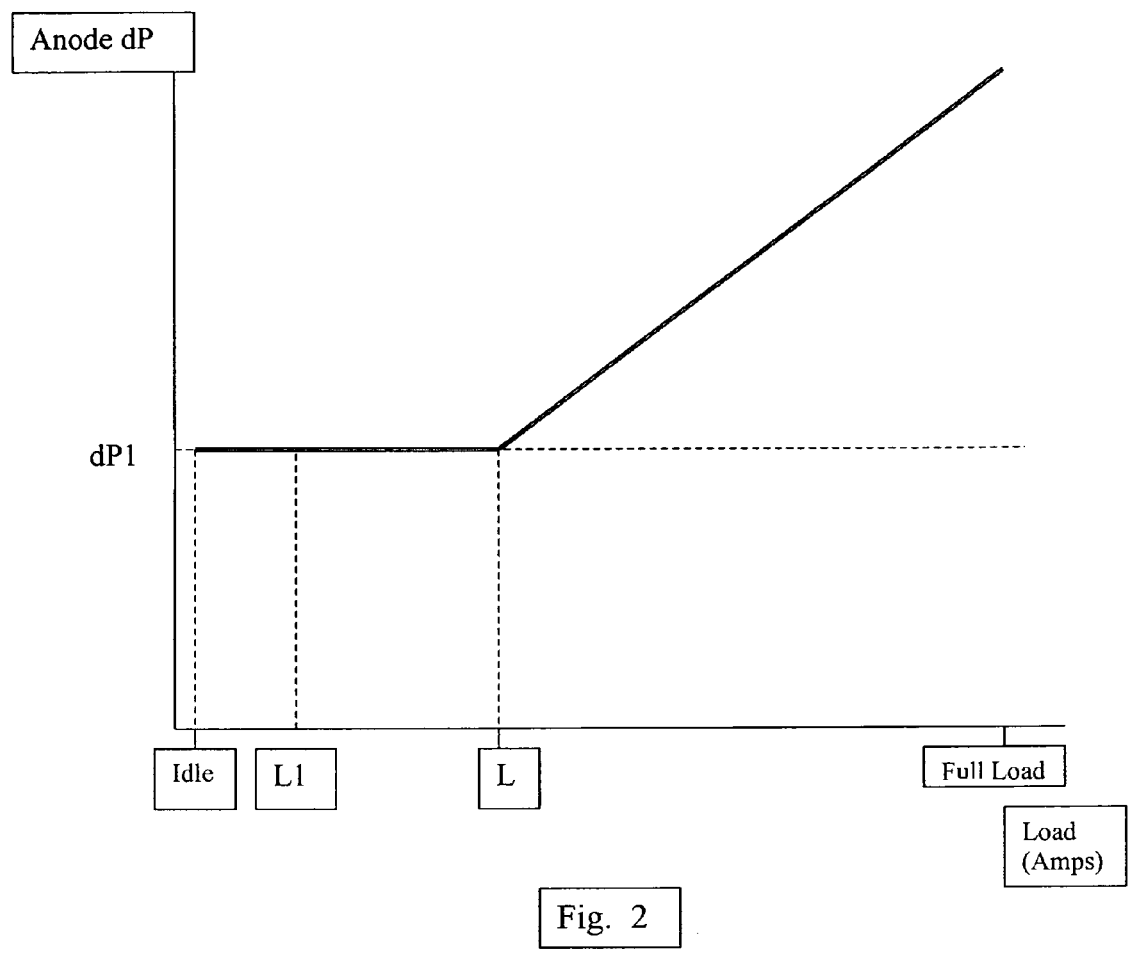
FIG. 2 is a representative illustration of the anode pressure differential as a function of load for a given stack design according to the embodiments described herein.

The operation of the fuel cell system of FIG. 1 will be discussed with reference to FIG. 2, which shows a representative illustration of the anode pressure differential as a function of the load during operation of a fuel cell. When the stack operates at low loads (loads below a value L) the anode pressure differential is maintained at a constant value dP1. Load L corresponds to a minimal anode pressure differential between anode inlet and outlet that ensures an adequate removal of water droplets from the anode flow field channels, and will vary according to fuel cell stack design and characteristics. For example, for a load L1 applied to the fuel cell system close to idle, the anode pressure differential during the time when valve 10 is open is equal to the anode pressure differential for loads bigger than L1 and smaller than L and sufficient for adequately removing the water droplets from anode flow field channels. When the fuel cell stack operates at normal and high loads (loads higher than L), the anode pressure differential is higher than dP1, and therefore ensures an adequate water removal from the anode flow field channels.

When operating at normal and high loads, valve 10 is closed and thus the fuel supplied from fuel supply 8 is directed through bypass line 14 to pressure regulator 15, jet pump 12, and further to fuel inlet 3. The fuel exhausted from the stack is recirculated through recirculation line 13 and supplied back to the fuel cell stack, being entrained by the motive flow in jet pump 12. The fuel pressure in the fuel supply line 9 is sufficient to ensure adequate entrainment of the recirculated fuel stream by the fresh fuel stream, and the anode pressure differential created in the stack is sufficient for adequately removing the water droplets from the anode flow field channels and ensuring stable stack operation.

When operating at low loads, valve 10 is initially open. Controller 16 controls valve 10 to vary the amount of fuel supplied to the stack such that the anode pressure differential is maintained at dP1 (or within an acceptable pressure range about dP1). Therefore, when the actual load is less than load L, the amount of fuel supplied to the fuel cell stack is more than the fuel consumed, which results in fuel accumulation in the anode loop and an increase in anode pressure. The fuel cell stack can tolerate only a certain pressure differential between anode and cathode and therefore, when the anode-cathode pressure differential reaches a predetermined threshold A, control unit 16 closes valve 10 to reduce or, alternatively, stop the fuel supply to the stack, allowing at least a portion of the accumulated fuel to be consumed and reducing the anode pressure. If valve 10 is completely closed and fuel supply to the stack is temporarily stopped, the pulse of fuel supply when valve 10 is subsequently opened is stronger than if fuel flow to the stack would be reduced and therefore the time to adequately remove the water droplets from the anode flow field channels is shorter. When the anode-cathode pressure differential drops to a predetermined lower value B, the control unit 16 opens valve 10 and the cycle repeats.

The periodic opening and closing of valve 10 at low loads creates a pulsed fuel supply to jet pump 12 and allows more fuel to enter the anode than the actual consumption required by the load, which results in periodic high recirculation rates and some fuel accumulation in the anode loop. This causes an overall improved fuel recirculation by creating an adequate motive flow in the jet pump and better removal of water droplets from the anode flow field channels. Even if the anode pressure differential drops during the brief periods of time when valve 10 is closed and, as a consequence, water accumulates in the fuel cell stack, the increase of anode pressure differential when valve 10 is next opened will remove the accumulated water from the anode flow field channels.

Figure 3:
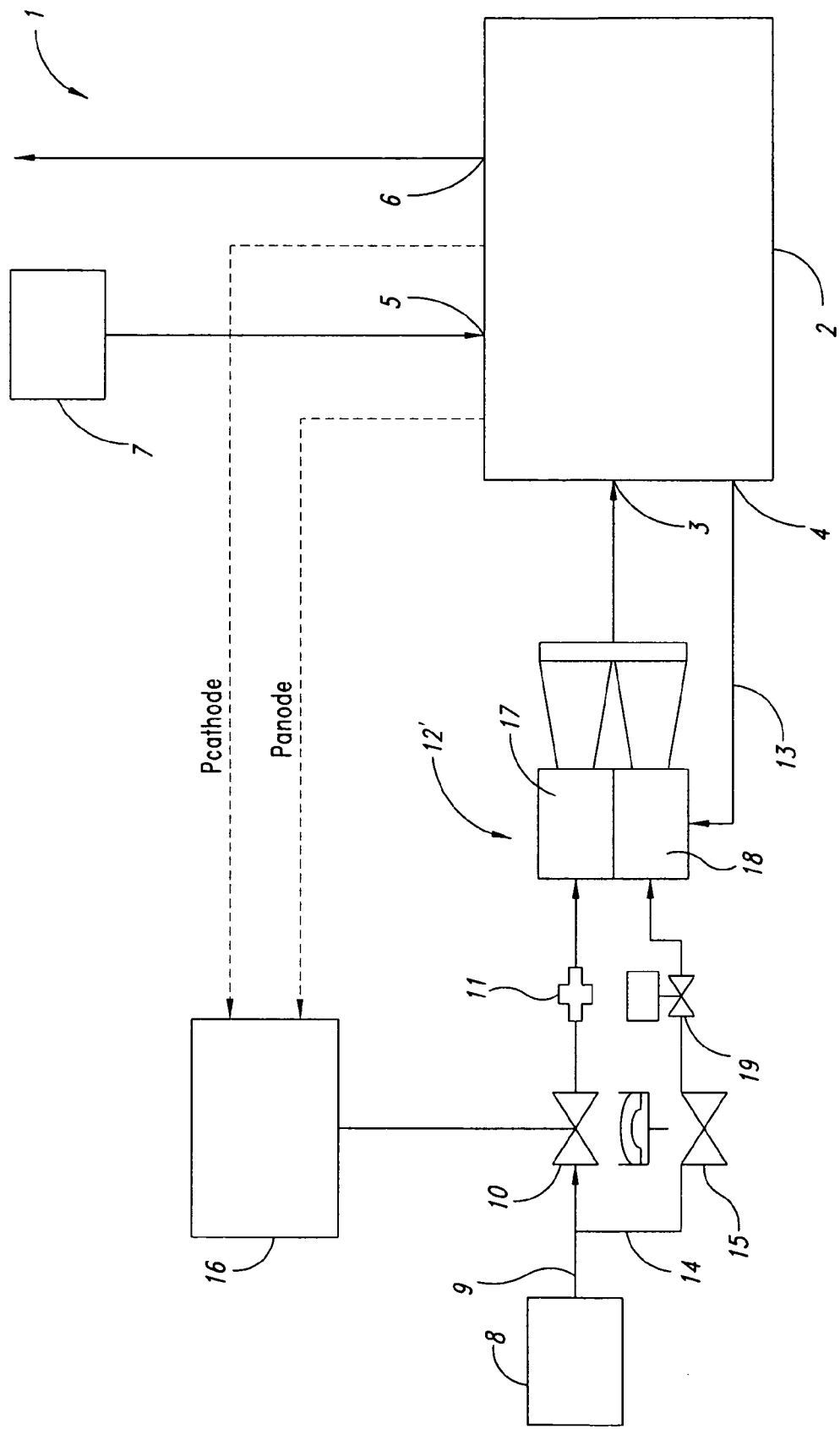
FIG. 3 is a schematic diagram of an embodiment of a fuel cell system including a double jet pump for recirculating the fuel stream.

In an alternative embodiment, as shown in FIG. 3, jet pump 12 of the first embodiment is replaced by a double jet pump 12' consisting of a pulsing jet pump 17 and a main jet pump 18. Pulsing jet pump 17 has a smaller fuel nozzle diameter than main jet pump 18. This allows a higher pressure feed for the fuel stream during the bursts of fuel recirculation effected at low loads and results in higher recirculation rates. The anode-cathode pressure differential at which valve 10 closes decreases and the pulsed fuel feed to the stack can be used in fuel cell systems with smaller anode-cathode pressure differential tolerance.

When operating at normal and high loads, fuel is supplied from fuel supply 8 through bypass line 14, pressure regulator 15 and an additional valve 19 to the main jet pump 18 and further to stack fuel inlet 3. Valve 19 may be, for example, a solenoid valve. During periods of normal and high loads valve 10 on the pressurized fuel supply line 9 is closed. Similar to the previously described embodiment, the fuel exhausted from the stack through the fuel outlet 4 is recirculated through fuel recirculation line 13.

When operating at low loads, valve 19 is closed, valve 10 is initially open and fuel is supplied from fuel supply 8 through pressurized fuel supply line 9 and valve 10, restriction orifice 11 to pulsing jet pump 17, and further to fuel inlet 3. Similarly to the first embodiment, control unit 16 closes valve 10 to reduce or stop the fuel supply to the fuel cell stack when the anode-cathode pressure differential reaches a predetermined threshold value A, and opens valve 10 when the anode-cathode pressure differential drops to a predetermined threshold value B, which is lower than the predetermined threshold value A.

For both embodiments described above, one of ordinary skill in the art can readily select the parameters of operation, such as the time required for removing a sufficient amount of water droplets from the anode flow field channels, according to the fuel cell system architecture, stack design, volumetric fuel flow and fuel velocity for a given application. Similarly, the predetermined threshold values of the anode-cathode pressure differential A and B at which valve 10 is closed or open, respectively, and the values of load L that ensures a minimum anode pressure differential, also depend on each stack's design and characteristics, the fuel cell system operating conditions and other limiting factors such as the valve characteristics (response time, flow rate, etc.). For automotive applications, for example, the fuel cell stack is designed to tolerate sudden drops in fuel or oxidant pressure as might happen during the stack down transient time. Therefore the range of allowable anode-cathode pressure differentials when the cathode pressure is approximately constant is large enough to allow valve 10 to stay open until a sufficient amount of water droplets is removed from the anode flow field channels. For example, a suitable range in this context for the minimum anode pressure differential, dP1, is 30 to 50 mbar, while the difference between threshold values of the anode-cathode pressure differentials A and B would typically be between 400 and 1100 mbar. For other applications, similar arrangements may be made such that the range of allowable anode-cathode differentials is large enough to allow adequate removal of water from the anode flow field.

As one of ordinary skill in the art will appreciate, various modifications may be made to the embodiments illustrated in FIGS. 1 and 3 without deviating from the spirit and scope of the invention. For example, since, at low loads, the period of time that valve 10 remains in the open position to allow adequate removal of water from the anode flow field channels is always about the same for a particular stack design and specific operating conditions, a timing device may be used to periodically open and close valve 10.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method for operating a fuel cell system comprising a fuel cell stack comprising a fuel inlet and fuel outlet and an oxidant inlet and oxidant outlet and at least one fuel cell comprising a membrane, an anode and a cathode, the anode fluidly connected to the fuel inlet and fuel outlet, the cathode fluidly connected to the oxidant inlet and oxidant outlet and, a fuel supply line for supplying a fuel to the fuel inlet, a jet pump connected to the fuel supply line, a recirculation line connecting the fuel outlet with the jet pump, a solenoid valve arranged in the fuel supply line between the fuel supply and upstream of the jet pump for opening or closing fuel supply to the stack and capable of being controlled to produce a pulsed fuel supply to the stack, a bypass line connected between the fuel supply and the jet pump, and a control unit for operating the valve in response to an operational parameter indicative of the anode-cathode pressure differential, the method comprising the steps of:
    determining the load on the fuel cell at which there is the minimum anode pressure differential between the anode inlet and anode outlet to ensure adequate removal of water droplets accumulated in the anode flow field channels, and assigning this load a value L;
    determining the load currently applied to the fuel cell system;
    closing the solenoid valve in the fuel supply line to direct fuel to the fuel cell stack via the bypass line, a pressure regulator, the jet pump, and the fuel inlet when it is determined that the load applied to the fuel cell system is above the value L; and
    controlling the solenoid valve to produce a pulsed fuel supply to the stack when the load applied to the fuel cell system is below the value L by
    (a) initially opening the solenoid valve in the fuel supply line and supplying fuel to the fuel cell via the fuel supply line,
    (b) completely closing the solenoid valve in the fuel supply line and keeping closed the valve in the bypass line to stop the fuel supply to the stack when the operational parameter indicative of the anode-cathode pressure differential is above a first predetermined threshold value A, and
    (c) opening the solenoid valve to restart the fuel supply to the stack when the operational parameter indicative of the anode-cathode pressure differential drops below a second predetermined threshold value B, the second predetermined threshold value B being lower than the first predetermined threshold value A.

2. The method of claim 1, wherein the control unit operates the valve in response to an operational parameter indicative of the anode-cathode pressure differential, and controls the solenoid valve to produce a pulsed fuel supply to the stack when the load applied to the fuel cell system is below a value L.

3. A method for operating a fuel cell system comprising a fuel cell stack comprising a fuel inlet and fuel outlet and an oxidant inlet and oxidant outlet and at least one fuel cell comprising a membrane, an anode and a cathode, the anode fluidly connected to the fuel inlet and fuel outlet, the cathode fluidly connected to the oxidant inlet and oxidant outlet and, a first fuel supply line for supplying fuel to the fuel inlet, a jet pump connected to the first fuel supply line, a second fuel supply line for supplying fuel to the fuel inlet, a pulsing jet pump connected to the second line, a recirculation line connecting the fuel outlet with the jet pump and/or pulsing jet pump, a solenoid valve arranged in the first fuel supply line between the fuel supply and upstream of the jet pump for opening or closing fuel supply to the stack, a valve arranged in the second fuel supply line between the fuel supply and upstream of the pulsing jet pump for opening or closing fuel supply to the stack via the second fuel supply line, and a control unit for operating the valves in response to an operational parameter indicative of the anode-cathode pressure differential, the method comprising the steps of:
    determining the load on the fuel cell at which there is the minimum anode pressure differential between the anode inlet and anode outlet to ensure adequate removal of water droplets accumulated in the anode flow field channels, and assigning this load a value L;
    determining the load currently applied to the fuel cell system;
    closing the valve in the second fuel supply line and opening the valve in the first fuel supply line to direct fuel to the fuel cell stack via the first fuel line when it is determined that the load applied to the fuel cell system is above the value L; and
    controlling the valves to direct fuel to pass through the pulsing jet pump to produce a pulsed fuel supply to the stack when the load applied to the fuel cell system is below the value L by
    (a) initially opening the solenoid valve in the first fuel supply line and supplying fuel to the fuel cell via the first fuel supply line,
    (b) completely closing the solenoid valve in the first fuel supply line, and keeping closed the valve in the second line, to stop the fuel supply to the stack when the operational parameter indicative of the anode-cathode pressure differential is above a first predetermined threshold value A, and
    (c) opening the solenoid valve in the first fuel supply line to restart the fuel supply to the stack when the operational parameter indicative of the anode-cathode pressure differential drops below a second predetermined threshold value B, the second predetermined threshold value B being lower than the first predetermined threshold value A.

* * * * *